United States Patent [19]
Startup et al.

[11] Patent Number: 5,940,379
[45] Date of Patent: Aug. 17, 1999

[54] APPARATUS AND METHOD FOR USING MULTIPLE SPREADING CODES FOR DATA TRANSMISSION IN A SATELLITE COMMUNICATION SYSTEM

[75] Inventors: James William Startup, Chandler; William Joe Haber, Tempe, both of Ariz.

[73] Assignee: Motorola, Inc., Schaumburg, Ill.

[21] Appl. No.: 08/898,825

[22] Filed: Jul. 23, 1997

[51] Int. Cl.$^6$ ................................................. H04B 7/216
[52] U.S. Cl. .......................................... 370/320; 375/200
[58] Field of Search ..................... 370/316, 209, 370/210, 441, 479, 320, 516; 375/200, 205, 208, 375, 316, 326; 455/12.1, 3.1, 4.2

[56] References Cited

U.S. PATENT DOCUMENTS

| | | | |
|---|---|---|---|
| 5,210,770 | 5/1993 | Rice ............................................. | 375/1 |
| 5,257,257 | 10/1993 | Chen et al. ................................. | 370/18 |
| 5,363,404 | 11/1994 | Kotzin et al. ............................... | 375/1 |
| 5,394,391 | 2/1995 | Chen et al. ................................. | 370/18 |
| 5,438,565 | 8/1995 | Hemmady et al. ......................... | 370/60 |
| 5,579,307 | 11/1996 | Richetta et al. ........................... | 370/54 |
| 5,592,481 | 1/1997 | Wiedeman et al. ........................ | 370/316 |
| 5,613,191 | 3/1997 | Hylton et al. .............................. | 455/3.1 |
| 5,655,005 | 8/1997 | Weideman et al. ........................ | 370/320 |
| 5,691,974 | 11/1997 | Zehavi et al. .............................. | 370/203 |

FOREIGN PATENT DOCUMENTS

| | | | |
|---|---|---|---|
| 0608653 | 1/1993 | European Pat. Off. ........ | H04L 12/56 |
| 0748064 | 4/1996 | European Pat. Off. ........ | H04B 7/185 |
| 9013186 | 11/1990 | WIPO .............................. | H04B 7/00 |

*Primary Examiner*—Ajit Patel
*Assistant Examiner*—Chi ho Andrew Lee
*Attorney, Agent, or Firm*—Walter W. Nielsen; Frank J. Bogacz

[57] ABSTRACT

Signal routing from origination nodes (210) to destination nodes (250) in a spread spectrum communication system (100) is provided using spread spectrum routing codes. Origination nodes (210) and destination nodes (250) are identified using specific codes. Signal routes from origination nodes (210) to destination nodes (250) are determined in terms of multi-level paths. Different codes are used to identify the different path levels. Data that is to be sent to a particular user located at a destination node is first spread using the destination code for that destination node. This spread spectrum signal is spread a second time using a first-level path code. In addition, the data can be spread a third time using a second-level path code. During the transmission of the spread data decoding processes are performed and the decoded data is routed based on the results of these decoding processes.

35 Claims, 6 Drawing Sheets

400

APPARATUS AND METHOD FOR USING MULTIPLE SPREADING CODES FOR DATA TRANSMISSION IN A SATELLITE COMMUNICATION SYSTEM

FIELD OF THE INVENTION

This invention relates generally to packet switched communication systems and, more particularly, to apparatus and methods for using multiple codes for the transmission of data in a satellite communication system.

BACKGROUND OF THE INVENTION

Communication networks include a collection of resources that are employed to transport user information from origination nodes to destination nodes. The resources include switching nodes and communication links. In a packet switching network, user information takes the form of packetized digital data. The user information is carried in discrete individual packets, and each individual packet carries its own destination address along with at least a portion of the user information. Switching nodes evaluate the destination addresses to determine how to appropriately route the packets.

Service providers which operate communication networks and network users benefit from improved network efficiency. Service providers want improved efficiency because they can generate greater revenue by transporting a greater amount of user information using a given collection of network resources. Users want improved efficiency because the costs of providing the network resources can then be spread over a greater number of user information transfers to lower the costs of transporting any single item of user information.

In communication networks, and particularly satellite communication systems, any single network node, such as a satellite, is often required to process only a fraction of the total channels available to the network. A channel is typically processed by receiving a wideband signal, decomposing the wideband signal into many narrowband signals, demodulating the narrowband signal which conveys a channel of interest, picking the channel of interest out of a specific time slot if TDMA communication schemes are employed, and performing any repackaging, modulation, combination, or other function needed to pass the information obtained from the channel of interest toward its ultimate destination.

Different nodes process different channels from the total network allocation. All channels are used, but the usage is spread over many different nodes. From time to time, the mix of channels processed at the nodes changes. When nodes reside in satellites orbiting the earth in moving orbits, the mix of channels processed at the nodes can change on a minute by minute basis. Accordingly, network nodes are typically configured to process a greater number of channels than they actually need to process at any given instant. This type of configuration leads to inefficiencies which have particularly serious consequences when the nodes are located in earth-orbiting satellites.

In a code division multiple access (CDMA) system, a number of users are superimposed over each other in the same frequency channel. These codes operate with multiple code symbols per user bit on each user and spread the energy for each user over a broader spectrum than would otherwise be required. The codes can be superimposed over each other as long as they are mutually orthogonal.

Unfortunately, conventional packet switching and other networks are operated in a relatively inefficient manner. Inefficiencies result when header information must be attached to data packets so that routing can be performed. This can lead to the consumption of system resources such as communication links to transport routing information instead of user information. The portion of link bandwidth which is used to transport header information cannot be used to transport user information, and this results in an inefficient use of network resources.

While the problems associated with the inefficient use of network resources plague a wide variety of communication networks, they have more serious consequences in networks which rely on RF communication links.

There is also a significant need for apparatus and methods for providing more efficient routing of user information within a satellite communication system. In addition, there is a significant need for apparatus and methods for increasing the utilization of the on-board resources of orbiting satellites by small modifications to the satellites and terrestrial equipment.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

DETAILED DESCRIPTION OF A PREFERRED EMBODIMENT

The present invention provides the apparatus and methods for providing more efficient routing of user information within a particular satellite communication system. In addition, the present invention provides the apparatus and methods for increasing the utilization of the on-board resources of orbiting satellites by small modifications to the satellites and terrestrial equipment.

Figure 1:
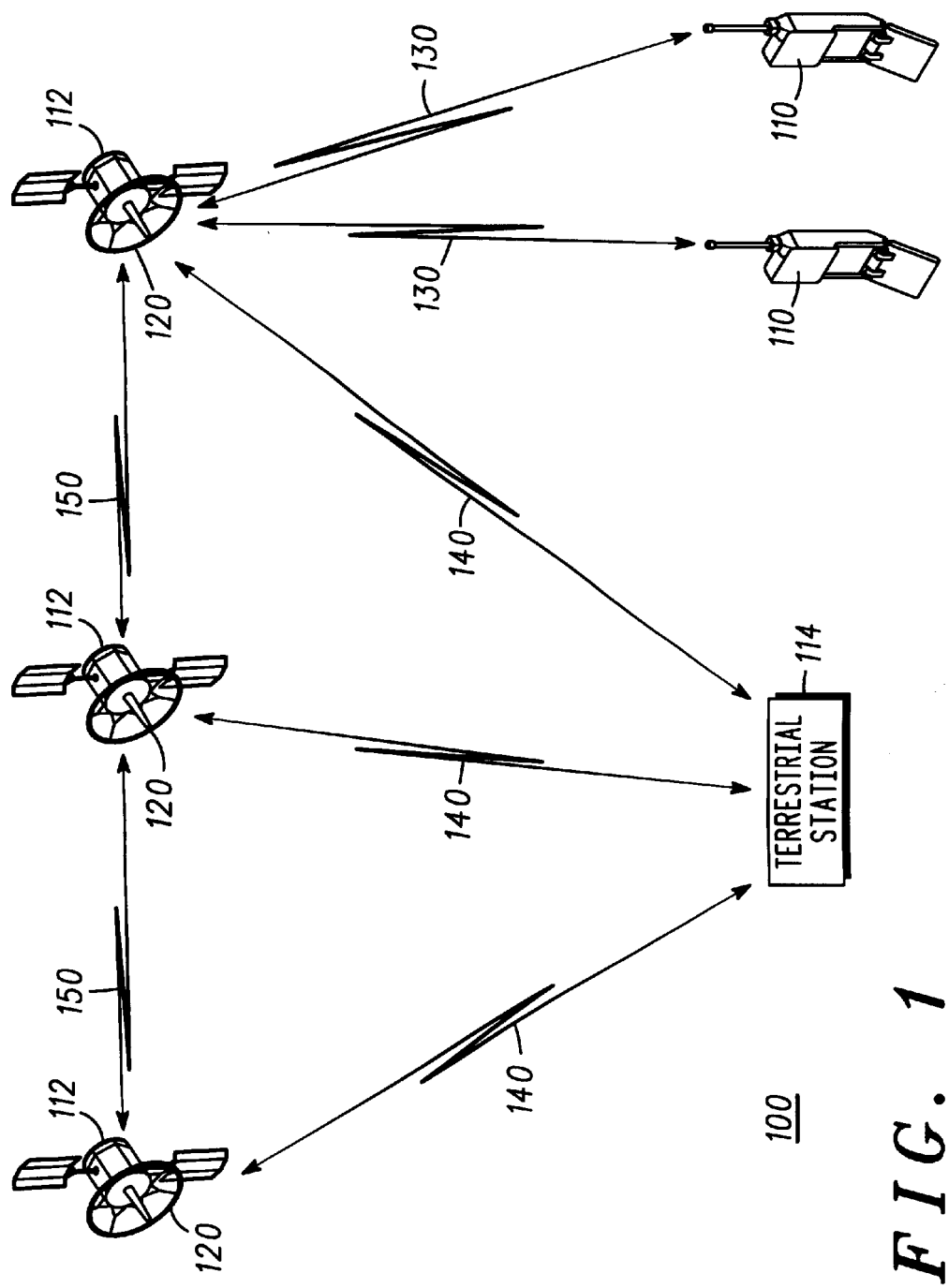
FIG. 1 shows a simplified block diagram of a satellite communication system within which a coded routing methodology can be implemented in accordance with a preferred embodiment of the present invention.

FIG. 1 shows a simplified block diagram of a satellite communication system within which a coded routing methodology can be implemented in accordance with a preferred embodiment of the present invention. Satellite communication system 100 includes communication units 110, communication satellites 112 and terrestrial station 114. Communication units 110, communication satellites 112, and terrestrial stations 114 can be viewed as nodes in satellite communication system 100. Communication units 110 communicate with communication satellites 112 using radio frequency (RF) communication links 130. Terrestrial station 114 communicates with communication satellites 112 using communication links 140. Communication satellites 112 communicate with other communication satellites 112 using communication links 150.

Terrestrial station 114 can be a gateway and/or a control center. The numerous nodes in the communication system can be coupled together through the RF communication links. FIG. 1 depicts the nodes as being configured as communication units 110, communication satellites 112, and terrestrial station 114. Through the RF communication links, communication units 110, terrestrial station 114, and communication satellites 112 can communicate with other communication satellites, communication units, and terrestrial stations. The below-discussed features of a preferred embodiment of the present invention can be practiced at any node of satellite communication system 100 or any node of other communications systems.

Communication satellites 112 can reside in low earth orbits. In such orbits, satellites 112 move at high speed relative to any given point on the surface of the earth. Communication units 110 and terrestrial stations 114 can reside proximate to the surface of the earth and as such they are virtually stationary relative to satellites 112. Because of the relative movement between the communication satellites and communication units 110, the communication link is a temporary one, and hand-off schemes are employed to realize a continuous communication channel.

Communication satellites 112 are desirably configured as spread spectrum communications base stations and can be referred to as nodes below. Desirably, a communication unit in this communication system can communicate with the communication satellites visible to it at a particular time. For example, power monitoring may be done by communication units 110 to determine which communication satellites 112 are the best candidates for establishing a connection.

Antennas 120 on-board satellites 112 are configured to have multiple beams and to project cells (not shown) toward the surface of the earth. Communications with communication units 110 are conducted in accordance with channels assigned for use in the beams at any given instant. Due to the high speed movement of satellites 112, the channel assignments can change from minute to minute.

User information exchanged between communication units is received at a communication satellite 112 via communication links 130. If the information is destined for a distant user, the information can be passed onward within the network of communication satellites using links 150 toward the ultimate destination. Such user information can be received from terrestrial station 114 along with other information, such as signaling and trunked information.

Generally, antennas 120 provide wideband signals each of which can convey numerous channels of information. In a preferred embodiment, the information is conveyed using spread spectrum techniques. The channels of information are combined together in the wideband signals using code division multiple access (CDMA) techniques.

Communication satellites 112 receive spread spectrum (wideband) signals at an input port which serves as the incoming portion of links (130, 140). Communication satellites 112 then can either decode the wideband signals into narrower band signals which convey less information or pass the undecoded signals on to another node in the system.

The signals which are decoded to be broadcast to another local node in the system use the satellite as a redirector. Signals received on a uplink channel are decoded. The decoding process routes the information in the signal to the proper downlink channel, and the satellite transmits the information on the downlink. Links 130, 140 and 150 support communication and signaling traffic in both directions.

The signals, which are decoded to be sent to a non-local destination node, are routed to different subsystems in communication satellite 112. These signals are generally routed to appropriate crosslinks 150. For example, appropriate crosslinks 150 are the ones which further the movement of the information toward the information's ultimate destination node.

Communication units 110 decode the information from the individual channel coded with their specific code. The individual channel which has been decoded by a particular communication unit is demodulated to obtain communicated information. Communication units 110 encode the information which they transmit with a destination node code and routing codes.

Terrestrial stations 114, like communication units 110 and communication satellites 112, can modulate and demodulate the information after it has been received and decoded. Terrestrial stations 114, like communication units 110 and communication satellites 112, generate spread spectrum signals. Terrestrial stations 114 and some communication units can combine information from several different users into a wideband signal. The wideband signal is then transmitted over an uplink. Terrestrial stations 114 and some communication units can separate information that has been sent with other modulated data in a wideband signal. The wideband signal is one which has been received on an incoming portion of a link.

In accordance with a preferred embodiment of the present invention, terrestrial stations 114, communication units 110, and communication satellites 112 provide extensive receiving and decoding functions to accommodate the numerous diverse channels and the various received wideband signals which satellite communication system 100 uses. Terrestrial stations 114 and communication satellites 112 also can comprise limited switching functions along with some demodulation and modulation functions. The switching functions provide alternate means for providing the routing (interconnectivity) needed between nodes. Decoding functions provide the primary routing mechanism, and switching functions are used for secondary and backup routing. Consequently, each node does not need to incorporate switching functionality sufficient to accommodate all channels used in system 100 since only a small fraction of the channels requires alternate routing at any single node at any given instant.

Figure 2:
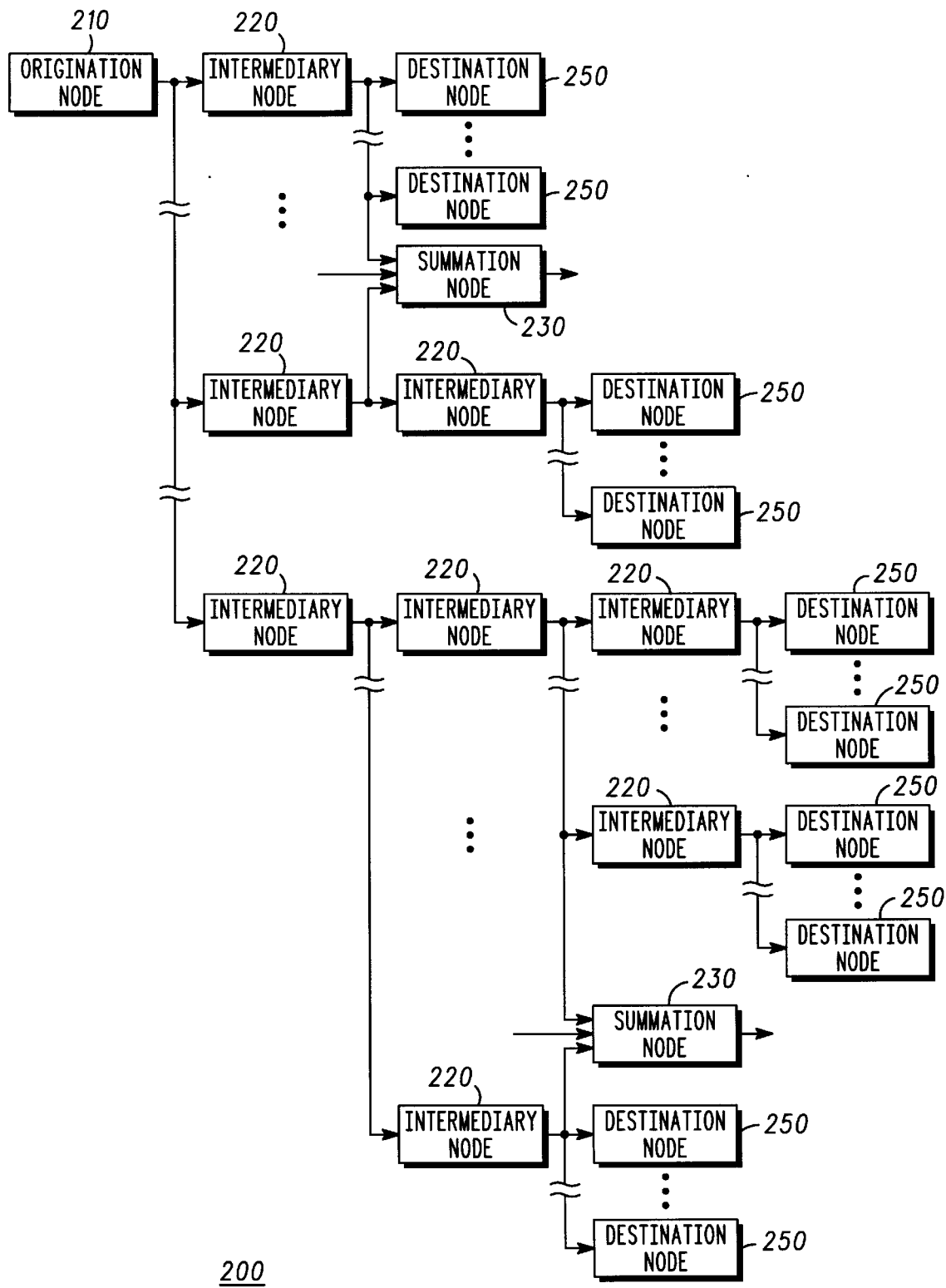
FIG. 2 shows a simplified block diagram for an exemplary routing system using a number of intermediary nodes in accordance with a preferred embodiment of the present invention.

FIG. 2 shows a simplified block diagram for the encoding process in an exemplary routing system using a number of intermediary nodes in accordance with a preferred embodiment of the present invention. Routing system 200 comprises at least one origination node 210, intermediary nodes 220, summation nodes, and destination nodes 250. Each intermediary node typically comprises at least one decoder and at least one processor.

In a preferred embodiment of the present invention, the route between origination node 210 and destination node 250 comprises two intermediary nodes 220. In a preferred embodiment, two routing codes and the destination code are required to route the message information from the origination node to the destination node. The terms "message information" and "message" should be understood to include information of any sort. Each destination node is identified using a destination code.

The communication system is used to establish a first route from an origination node to a destination node. The communication system determines the route and the number of intermediary nodes. The communication system determines a set of routing codes for the route. Each of the intermediary nodes is identified by a routing code, and the set of routing codes comprises all of the routing codes needed to complete the route. The communication system sends the destination code and the set of routing codes to the origination node.

The origination node encodes a first block of message information into an encoded message using the destination code and the set of routing codes. The origination node sends the encoded message to at least one intermediary node.

In alternate embodiments, the route between origination node 210 and one of the destination nodes 250 can include only one intermediary node 220. In these cases, only one routing code and the destination code are required to route the message information from the origination node to the destination node. In other cases, the route between origination node 210 and one of the destination nodes 250 includes two or more intermediary nodes. In these cases, the destination node code is required along with one or more routing codes.

The decoder used in intermediary node 220 can be a conventional circuit known to those skilled in the art. Decoders translate wideband signals into a plurality of narrower bandwidth signals. The decoders can operate on baseband digital signals. For example, a wideband signal can carry different channels using different frequency bands and different spread spectrum coding, or a combination of the two techniques. A wide range of decoding architectures known to those skilled in the art can be used to implement the decoder. The precise structure of the decoder will depend in part upon the nature of the signals supplied at its input port.

Exemplary routing system 200, shown in FIG. 2, illustrates several different routes. A route between origination node 210 and destination node 250 is shown which only requires one intermediary node 220. In this case, the decoder in intermediary node 220 uses only a first-level routing code to decode the input signal from the origination node into the output signal sent to the destination nodes. Each individual destination nodes uses its particular destination code to further decode the signal into message information.

The route used in a preferred embodiment is shown in which two intermediary nodes 220 are used. In this case, the decoder in the first intermediary node uses a first-level routing code to establish the signal's path through the first intermediary node. In the second intermediary node, the decoder uses a second-level routing code to route the decoded signal to the correct destination node. Each individual destination nodes uses its particular destination code to further decode the decoded signal into message information.

Another example route is shown which comprises three intermediary nodes 220. In this case, the decoder in the first intermediary node uses a first-level routing code to establish the signal's path through the first intermediary node. In addition, the decoder in the second intermediary node uses a second-level routing code to establish the signal's path through the second intermediary node. In the third intermediary node, the decoder uses a third-level routing code to route the decoded signal to the correct destination node. Each individual destination nodes uses its particular destination code to further decode the decoded signal into message information.

Those skilled in the art will appreciate that many different structures can be useful in this routing system. Routes can be established with more than three intermediary nodes. In addition, nothing prevents the output signals from a intermediary node from being provided in parallel over a common communication path to more than one other intermediary node. In other embodiments, intermediary node 220 can be implemented, at least in part, using a digital signal processor.

In alternate embodiments, summation nodes 230 can be used to combine decoded signals. These combined signals can be sent to other subsystems for further processing. FIG. 2 shows an additional input signal port on summation node 230. This port and the associated signal are shown for convenience to illustrate the inherent flexibility in routing system 200. A typical routing system often comprises many summation nodes 230, and the present invention does not restrict the number of summation nodes, nor does the invention limit the number of intermediary nodes.

Routing system 200 comprises any number of user nodes, which FIG. 2 depicts as origination nodes 210 and destination nodes 250, and any number of intermediary nodes 220. The present invention does not require the user nodes to act exclusively as origination nodes 210 or destination nodes 250. User nodes can act both as origination nodes 210 and destination nodes 250. The origination and destination node designations are provided to illustrate example scenarios which are described below.

Generally, user information can be generated at origination node 210 and destination node 250. The user information is digitized and incorporated into a block structure which includes code structure for routing purposes. The blocks are delivered to routing system 200 to be transported to one or more intended destination nodes 250. The coded block comprises message (user) information and routing information. The routing information includes a network routing code or set of codes including a code specifying the address of the intended destination node or nodes. Intermediary nodes 220 use this routing code to route the user information to the one or more intended destination nodes. As indicated in FIG. 2, a diverse assortment of routes can be followed in transporting user information from origination node 210 to destination nodes 250. The user information originally encoded into a block at origination node 210 can traverse any number of intermediary nodes 220 before arriving at an intended destination node 250 where it undergoes its final processing.

Those skilled in the art will recognize that codes used by the different decoding stages can be the same or different depending on the requirements and structure of the routing system. Decoding is performed in a manner well known to those skilled in the art.

Code selection allows each intermediary node 220 to dynamically route user information. Intermediary nodes typically perform only a routing function. In other words, intermediary nodes 220 desirably refrain from modifying user information conveyed in the signals. The processor used in intermediary node 220 can perform a code selection function, or the system can provide the code selection function. The precise processing functions performed by intermediary node 220 depend upon system requirements. Different intermediary nodes 220 can perform the same or different functions, and any single intermediary node 220 can perform more than one function.

Multiple access systems can use spread spectrum techniques to allow multiple users access to the system at any one time. If each user is assigned a specific signal to use, spread spectrum techniques allow multiple signals occupying the same RF bandwidth to be transmitted simultaneously without interfering with one another.

If each user's signal is defined by a different code, then up to N users can be allowed access to a system using N orthogonal codes. If the codes are orthogonal, then the cross-correlation of two different codes is equal to zero.

The received signal is the sum of many individual signals coded with respect to an initial destination and a final destination. In one example, the initial destination could be a beam in a satellite transmit antenna, and the final destination could be a particular user. The initial processing involves decoding the received signal using an initial destination code. That portion of the received signal that is successfully decoded using the first initial destination code is the only information that will be transmitted by the first beam in the antenna's multi-beamed pattern. In this case, no switching is required. If the data passes through the decoder, it is sent on that beam.

The system knows which users are currently within a particular beam. The system knows the system identification for a particular user. The system assigns a particular spreading code to each individual user in the system.

Figure 3:
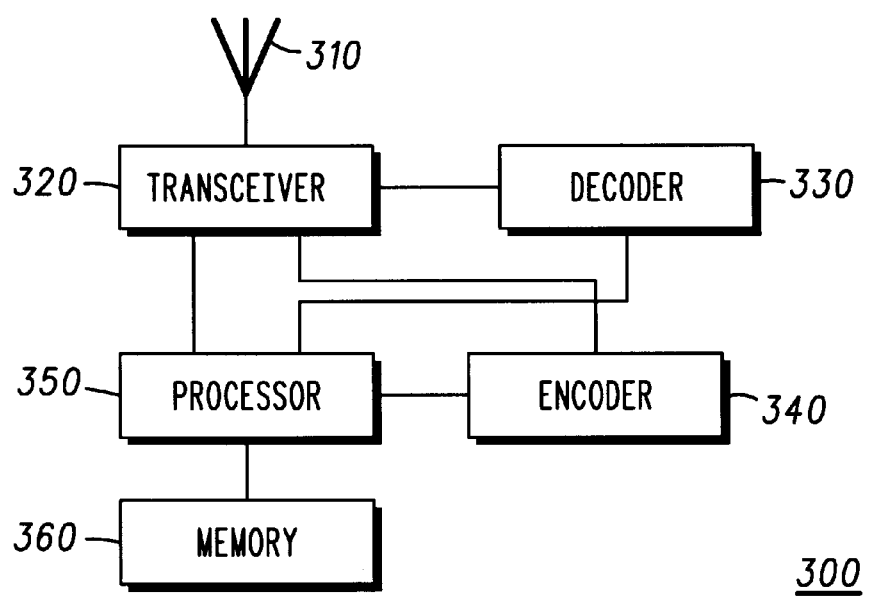
FIG. 3 shows a simplified block diagram of a communication device for use in accordance with a preferred embodiment of the present invention.

FIG. 3 shows a simplified block diagram of a communication device for use in accordance with a preferred embodiment of the present invention. Communication device 300 desirably comprises antenna subsystem 310, transceiver 320, decoder 330, encoder 340, processor 350, and memory 360. One antenna subsystem, one transceiver, one decoder, one encoder, one processor, and one memory are shown to simplify FIG. 3.

Those skilled in the art will recognize that although only one antenna subsystem is shown, antenna subsystem 310 can comprise many different antennas for many different purposes. For example, antennas are needed to support links to and from communication units, links to and from terrestrial stations and control centers, and links to and from communication satellites. Preferably, at least one antenna supports CDMA links to other communication devices.

Those skilled in the art will also recognize that although only one transceiver is shown, many are preferably located on each communication device. Again, by way of example, transceivers are needed to support links to and from communication units, links to and from terrestrial stations and control centers, and links to and from communication satellites. Preferably, at least one transceiver supports CDMA links to other communication devices.

Decoder 330 is coupled to transceiver 320 and to processor 350. Decoder 330 is used to decode spread spectrum signals received by the communication device. Encoder 340 is coupled to transceiver 320 and to processor 350. Encoder 340 is used to encode spread spectrum signals transmitted by the communication device.

Processor 350 is coupled to transceiver 320 as well as to decoder 330, encoder 340, and memory 360. Processor 350 can be implemented using one or more processors.

Memory 360 stores data that serve as instructions to processor 350 and that, when executed by processor 350, cause communication device 300 to carry out procedures which are discussed below. In addition, memory 360 includes variables, tables, and databases that are manipulated during the operation of communication device 300.

Processor 350 can provide management and control functions. Processor 350 preferably also provides for the allocation of the frequency and time-slot assignments for links between communication devices 300.

In a preferred embodiment, a spread spectrum decoder is placed on each Low Earth Orbit (LEO) satellite in the communication system. However, the present invention is applicable to systems including satellites having low-earth, medium-earth and high-earth orbits. Additionally, it is applicable to orbits having any angle of inclination (e.g., polar, equatorial or other orbital pattern).

Communication satellites communicate with terrestrial stations which can include some number of radio frequency (RF) communication units (CUs), gateways (GWs) and control centers. Communication satellites can be built to operate using FDMA, TDMA and/or CDMA communication techniques. Some communication satellites can be multi-modal which means that they can operate using one or more of the communication techniques.

Communication device 300 can be a terrestrial station 114 (FIG. 1) which can be a gateway or a control center. Communication device 300 can be a communication unit 110 (FIG. 1). Communication device 300 can also be a communication satellite 112 (FIG. 1).

Communication units and terrestrial stations can also be built to operate using Frequency Division Multiplex Access (FDMA), Time Division Multiple Access (TDMA), and or CDMA communication techniques. In addition, some communication units and terrestrial stations can be multi-modal which means that they can operate using one or more of the communication techniques. Communication units and terrestrial stations can communicate with more than one communication satellite at a time.

Communication units and terrestrial stations can be located anywhere on the surface of the earth or in the atmosphere above the earth. Communication units and terrestrial stations are preferably communications devices capable of transmitting data to and receiving data from communication satellites using spread spectrum techniques. For example, communication units can be data terminals adapted to communicate with communication satellites. Communication units can also be facsimile devices, pagers, imaging system terminals, or any other type of communication devices adapted to transmit spread spectrum data to and/or receive spread spectrum data from communication satellites.

Figure 4:
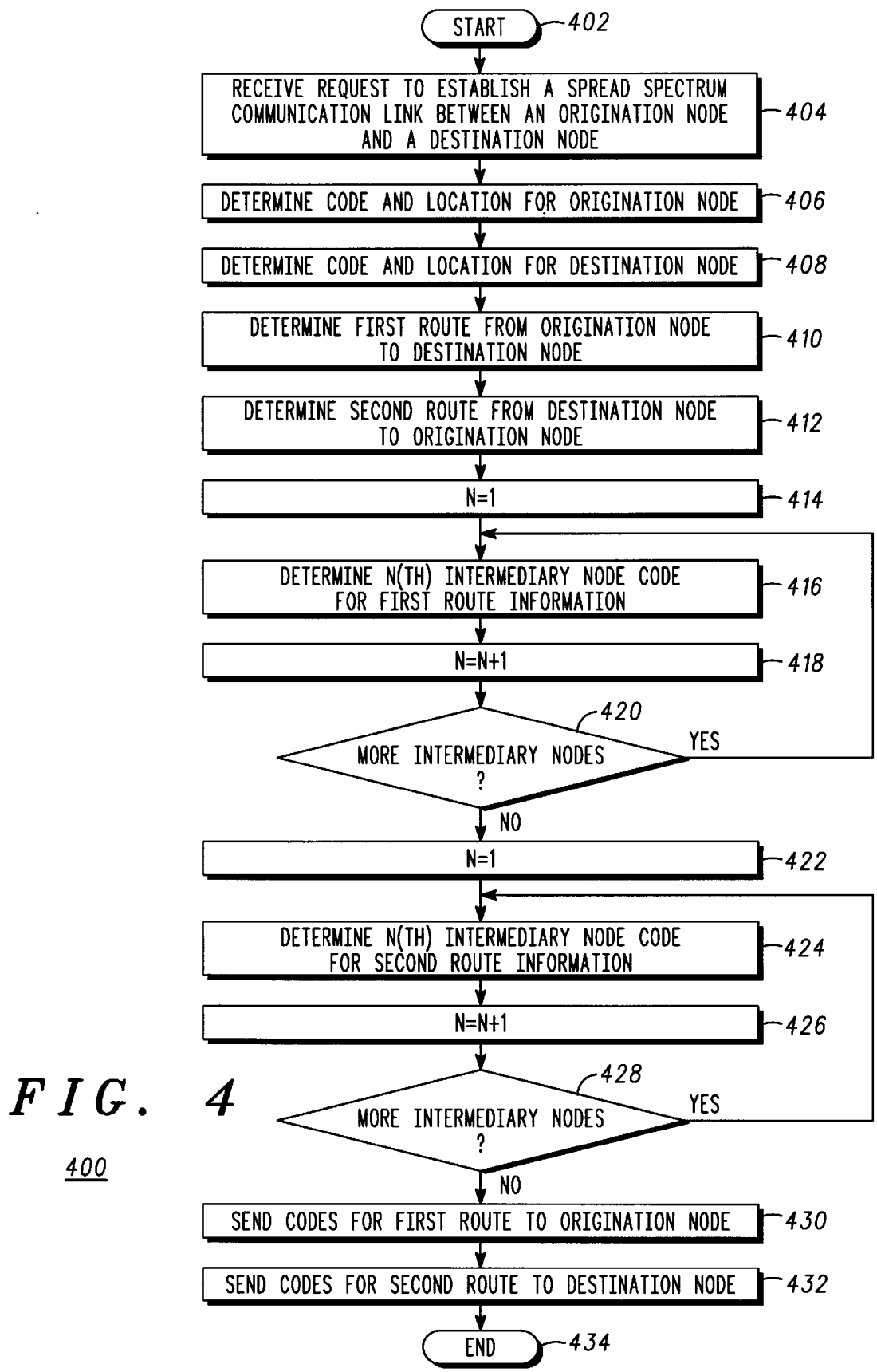
FIG. 4 shows a flow chart for determining routing codes which are used to spread a signal in a spread spectrum communication system in accordance with a preferred embodiment of the present invention.

FIG. 4 shows a flow chart for determining routing codes which are used to spread a signal in a spread spectrum communication system in accordance with a preferred embodiment of the present invention. Procedure 400 starts with step 402. The starting of procedure 400 could be the result of one spread spectrum user trying to contact another spread spectrum user. Both users are part of a global communication system that provides spread spectrum communication services to some of its customers.

In step 404, a request is received to establish a spread spectrum communication link between an origination node and a destination node. In a preferred embodiment, a two-way message transfer is used. In this situation, origination nodes can become destination nodes, and destination nodes can become origination nodes based on the direction of flow for the messages. In this case, a code which identifies a particular user could be used either as an origination code or a destination code.

For example, in a call setup procedure, the calling party is first identified as an origination node, and the called party is first identified as the destination node. When the called party responds back to the calling party, the called party is identified as an origination node, and the calling party is identified as the destination node.

In step 406, the user code and location for the calling party are determined. The user code for the calling party and the location are determined using various protocols known to those skilled in the art. For example, the origination node (calling party) either knows its user code or it can be sent a user code in one or more messages. The location could be determined from a geo-location device, or from a memory device, or from an access beam algorithm or be sent to the calling party in one or more messages.

In step 408, the user code and location for the called party are determined. In this case, the user code for the called party is the destination code. In this example, the origination node, which could be a subscriber unit or a terrestrial station, uses the destination code to spread the message information. The user code for the called party and the location are determined using various protocols known to those skilled in the art. For example, the calling party can send a set of dialed digits in one or more access messages, and this information could be used to determine the user code and/or location for the called party.

Also, by way of example, the destination node (called party) either knows its user code or it can be sent a user code in one or more messages. In addition, the location for the destination node could be determined from a geolocation device, or from an access beam algorithm or be sent to the called party in one or more messages. In some cases, the called party's location could be determined from a memory device.

In step 410, a first route is determined from the origination node to the destination node. This first route from the origination node to the destination node can also include a number of intermediary nodes. For example, a route could comprise an origination node, an intermediary node, and a destination node. Another exemplary route could comprise an origination node, two intermediary nodes, and a destination node. Additional exemplary routes could comprise an origination node, three or more intermediary nodes, and a destination node. In a preferred embodiment, the route comprises an origination node, a first intermediary node (which is a satellite), a second intermediary node (which is an antenna beam decoder on the satellite), and a destination node.

In step 412, a second route is determined from the destination node to the origination node. This second route from the destination node to the origination node can also include a number of intermediary nodes. For example, a route could comprise an origination node, an intermediary node, and a destination node. Another exemplary route could comprise an origination node, two intermediary nodes, and a destination node. Additional exemplary routes could comprise an origination node, three or more intermediary nodes, and a destination node. In a preferred embodiment, the route comprises an origination node, a first intermediary node (which is a satellite), a second intermediary node (which is an antenna beam decoder on the satellite), and a destination node. Those skilled in the art will recognize that the second route can comprise but not need to comprise the same number of nodes as the first route.

In steps 414–420, the codes for the intermediary nodes in the first route are determined. In step 414, a counting variable "N" is initialized.

In step 416, the code for the Nth intermediary node in the first route is determined. In a preferred embodiment, the code for the first intermediary node identifies a particular satellite subsystem. In this case, the origination node, which could be a subscriber unit or a terrestrial station, uses the code for the first intermediary node to spread the message information. The origination node can separately perform spreading operations for the destination node coding and the intermediary node coding, or the origination node can combine the coding.

In step 418, the counting variable N is incremented by one. In step 420, a query is performed to determine if additional intermediary nodes are required to complete the first route. When additional intermediary nodes are not required, then procedure 400 branches to step 422. When additional intermediary nodes are required, then procedure 400 branches to step 416, and procedure 400 iterates as shown in FIG. 4.

In a preferred embodiment, a second intermediary node is required for the first route. The code for the second intermediary node in the first route is determined. In a preferred embodiment, the code for the second intermediary node is used to determined the antenna beam in which the destination node is located. In a preferred embodiment, the receive and transmit antennas on the satellite are multi-beam antennas, and groups of users can be identified using the beam within which they are located at a particular time.

In steps 422–428, the codes for the intermediary nodes in the second route are determined. In step 422, a counting variable "N" is initialized.

In step 424, the code for the Nth intermediary node in the second route is determined. In a preferred embodiment, the code for the first intermediary node in the second route identifies a particular satellite subsystem. In this case, the destination node for the first route becomes an origination node for the second route and uses the code for the first intermediary node in the second route to spread the message information. Origination nodes can separately perform spreading operations for the destination node coding and the intermediary node coding, or the origination node can combine the coding.

In step 426, the counting variable N is incremented by one. In step 428, a query is performed to determine if additional intermediary nodes are required to complete the second route. When no additional intermediary nodes are required, then procedure 400 branches to step 430. When additional intermediary nodes are required, then procedure 400 branches to step 424, and procedure 400 iterates as shown in FIG. 4.

In a preferred embodiment, a second intermediary node is also required for the second route. The code for the second intermediary node in the second route is determined. In a preferred embodiment, the code for the second intermediary node is used to determine the antenna beam in which the destination node for the second route is located. In a preferred embodiment, the receive and transmit antennas on the satellite are multi-beam antennas and groups of users can be identified using the beam within which they are located at a particular time. In some cases, the origination node and destination node can be located with the same beam and therefore use the same beam code.

In step 430, the codes for the first route are sent to the origination node. These codes include the code for destination node, the code for the antenna beam, and the code for the satellite to be used in the first route.

In step 432, the codes for the second route are sent to the origination node. These codes include the code for the destination node, the code for the antenna beam, and the code for the satellite to be used in the second route. Procedure 400 ends in step 434. When procedure 400 is completed, both the origination node and the destination node have the coding information they need to communicate with each other using spread spectrum routing.

Figure 5:
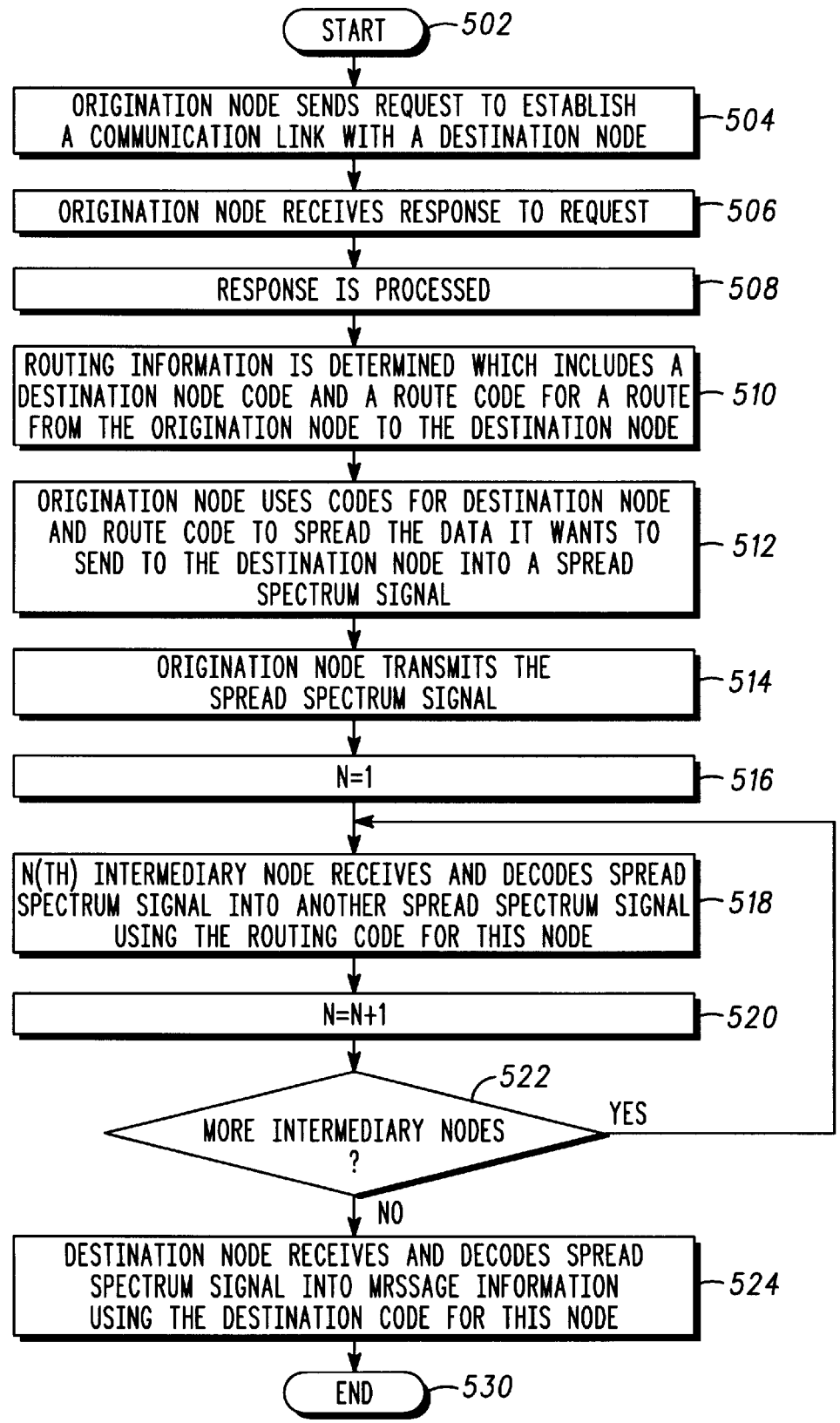
FIG. 5 shows a flow chart for using an origination node which has been adapted to use routing codes to spread and despread signals in a spread spectrum communication system in accordance with a preferred embodiment of the present invention.

FIG. 5 shows a flow chart for using an origination node which has been adapted to use routing codes to spread and despread signals in a spread spectrum communication system in accordance with a preferred embodiment of the present invention. Procedure 500 starts with step 502. The starting of procedure 500 could be the result of a user at the origination node attempting to make a call.

In step 504, the origination node sends a request to establish a communication link with a destination node. This is an indication the origination node has some message information which it would like to send to the destination node.

In step 506, the origination node receives a response to the request. In step 508, the origination node processes the response. For example, the response can be a denial of service message. In a preferred embodiment, the response contains a destination code and a route code.

In step 510, the routing information is determined. The route code can comprise one or more routing codes for intermediary nodes between the origination node and the destination node. In a preferred embodiment, the destination code is a code which identifies a particular subscriber. Also, one intermediary node is identified with an antenna beam code and another intermediary node is identified with a satellite subsystem code.

In step 512, the origination node first uses the destination code to spread the message information into a spread spectrum signal. Secondly, the origination node uses the antenna beam code to further spread the signal's spectrum. Next, the origination node uses the satellite code to perform the last portion of the signal spreading. Those skilled in art will recognize that the order in which the codes are used can be different from the order used in the above discussion. In alternate embodiments, the codes can be combined and one spreading operation is performed using the combined code.

In step 514, the origination node transmits the spread spectrum signal. In a preferred embodiment, the origination node transmits the spread spectrum signal to the satellite currently serving it.

In steps 516–522, the codes for the intermediary nodes are used to route the message information to the destination node. In step 516, a counting variable "N" is initialized. N is the number of intermediary nodes in a particular route.

In step 518, the code for the Nth intermediary node is used to decode the spread spectrum signal. In a preferred embodiment, the code for the first intermediary node identifies a particular satellite subsystem. In this case, the origination node, which could be a subscriber unit or a terrestrial station, has used the code for the first intermediary node to spread the message information. The intermediary node can use the intermediary node codes for the decoding.

In step 520, a counting variable N is incremented by one. The counting variable is used to generalize the procedure and to indicate that one or more intermediary nodes can be present in a route between an origination node and a destination node. In step 522, a query is performed to determine if additional intermediary nodes are present in this route. Again, the query is shown to illustrate the variable length of a route from an origination node to a destination node. In a preferred embodiment, the number of intermediary nodes is two. Alternate embodiments have been considered with one intermediary node and with three intermediary nodes. The processing gain restricts the number of intermediary nodes which can be used effectively. When the last intermediary node has received and decoded the spread spectrum signal, then procedure 500 branches to step 524. When additional intermediary nodes are present in a route, then procedure 500 branches to step 518, and procedure 500 iterates as shown in FIG. 5.

In step 524, the destination node receives and decodes the spread spectrum signal into message information using the destination code for this particular node. Procedure 500 ends in step 530.

Figure 6:
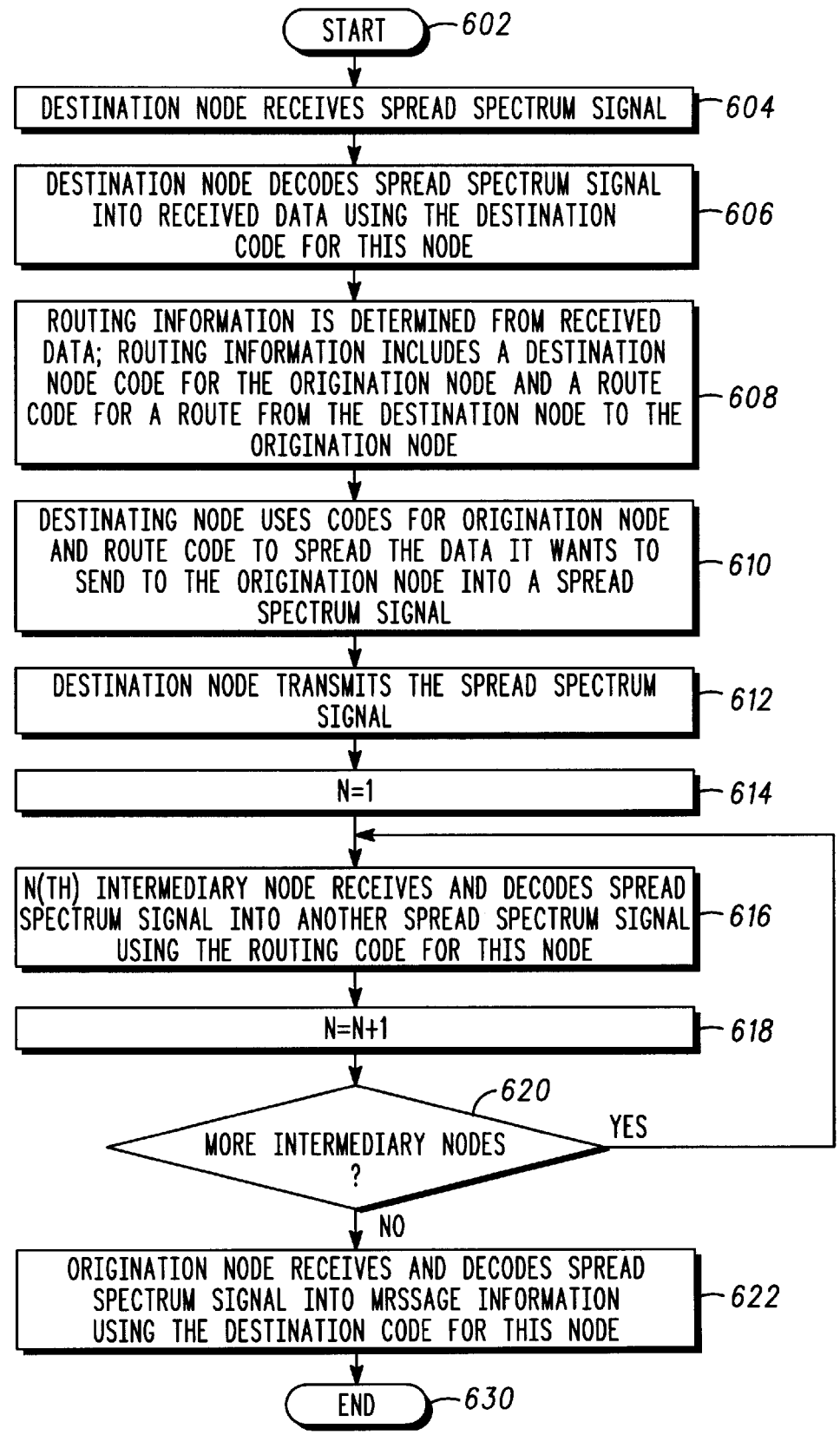
FIG. 6 shows a flow chart for using a destination node which has been adapted to use routing codes to spread and despread signals in a spread spectrum communication system in accordance with a preferred embodiment of the present invention.

FIG. 6 shows a flow chart for using a destination node which has been adapted to use routing codes to spread and despread signals in a spread spectrum communication system in accordance with a preferred embodiment of the present invention. Procedure 600 starts with step 602. The starting of procedure 600 could be the result of a user at a destination node being called by another user at an origination node.

In step 604, the destination node receives a spread spectrum signal. In step 606, the destination node decodes the spread spectrum signal into received data using the destination code for this node. In a preferred embodiment, the destination node is a spread spectrum device. For example, the spread spectrum device can be a space-based node such as a satellite or a terrestrial-based node such as a terrestrial station or a communication unit.

In step 608, routing information is determined from the received data. The routing information comprises a destination code for the origination node and a route code for a route from a destination node to an origination node. This is the route which the message information that the destination node wants to send to the origination node has to use. The message information is encoded using this routing information.

In step 610, the destination node uses the codes for the origination node and the route code to spread the data it wants to send to the origination node into a spread spectrum signal.

In step 612, the destination node transmits the spread spectrum signal. In a preferred embodiment, the destination node transmits the spread spectrum signal to the satellite currently serving it.

In steps 614–620, the codes for the intermediary nodes are used to route the message information to the origination node. In step 614, a counting variable "N" is initialized. N is the number of intermediary nodes in a particular route from the destination node to the origination node.

In step 616, the code for the Nth intermediary node is used to decode the spread spectrum signal. In a preferred embodiment, the code for the first intermediary node identifies a particular satellite subsystem. In this case, the destination node, which could be a subscriber unit or a terrestrial station, has used the code for the first intermediary node to spread the message information. The intermediary node uses its intermediary node code for the decoding.

In step 618, a counting variable N is incremented by one. The counting variable is used to generalize the procedure and to indicate that one or more intermediary nodes can be present in a route between a destination node and an origination node.

In step 620, a query is performed to determine if additional intermediary nodes are present in this route. As before, the query is shown to illustrate the variable length of a route from a destination node to an origination node. In a preferred embodiment, the number of intermediary nodes is two. Alternate embodiments have been considered with one intermediary node and with three intermediary nodes. The processing gain restricts the number of intermediary nodes which can be used effectively.

In a preferred embodiment, the first intermediary node is a satellite subsystem decoder. The received spread spectrum signals are decoded by the satellite subsystem decoder. This decoder uses the satellite subsystem code as the first despreading code. Signals which are not despread by this satellite's code are sent to other subsystems on the satellite for further processing. For example, other satellite codes could be used to route the information to one of several nearest neighbors in a satellite communication system. Other satellite codes could be used to route the information to satellites in the same orbital plane or other orbital planes.

In a preferred embodiment, the signal that was despread by the satellite subsystem decoder stage is decoded again by a second intermediary node decoder. For example, this second intermediary node decoder can be an antenna beam decoder. In this case, the outputs from this decoder are coupled to specific beams in the multi-beam antenna. Only the information that passes through the decoder is transmitted by that beam. Each decoder output is a function of the antenna beam code being used at the time. Codes can be changed at various times to maintain a higher level of security and provide some system flexibility with respect to fading margins.

In a preferred embodiment, the despread signal is transmitted in the correct antenna beam along with signals for other users in this same beam. The signals are all still spread spectrum signals but the coding used for routing is no longer present. The amount of spectrum spreading is now dependent on the destination code.

When the last intermediary node has received and decoded the spread spectrum signal, then procedure 600 branches to step 622. When additional intermediary nodes are present in a route, then procedure 600 branches to step 616, and procedure 600 iterates as shown in FIG. 6.

In step 622, the origination node receives and decodes the spread spectrum signal into message information using the destination code for this particular node. Procedure 600 ends in step 630.

In a preferred embodiment of the present invention, a terrestrial station can be used as both an origination node and a destination node. Spread spectrum signals can be received and transmitted by a terrestrial station.

When spread spectrum signals are received at a terrestrial station, the received spread spectrum signals are sent to at least one terrestrial station subsystem decoder. This decoder uses the terrestrial station subsystem code as the despreading code. The received spread spectrum signals are sent to all of the terrestrial station subsystem decoders that are in this terrestrial station. Signals which are not despread by this terrestrial station's subsystem decoders are sent to other subsystems within the terrestrial station for further processing. For example, other terrestrial station subsystem codes could be used to route the information to one of several nearby terrestrial stations in a satellite communication system. Other terrestrial station codes could be used to route the information to the control center.

In a preferred embodiment, the signal that was despread by the first decoder stage is decoded again by the terrestrial services decoder. The outputs from this decoder are coupled to specific services provided by this particular terrestrial station. Only the information that passes through the decoder is applicable to these other services. One or more of the decoder outputs can be used to provide information to the PSTN. Terrestrial station codes like other codes used in the communication system can be changed at various times to maintain a higher level of security and provide some system flexibility.

The despread signal is sent to the correct service system along with signals for other users intended for this same service system. The signals are all still spread spectrum signals but the coding used for routing is no longer present. The amount of spectrum spreading is now dependent on the destination code. In the case of PSTN information, the destination code could be the number used to identify the PSTN user.

Typically, decoding procedures are initiated by the reception of spread spectrum signals, and encoding procedures are initiated by a need for the transmission of spread spectrum signals.

Data and communication information can be received from PSTN users. In this case, the terrestrial station determines the satellite code, antenna beam code and destination code for the information. If the terrestrial station can establish the required spread spectrum links, then the terrestrial station encodes the message information using routing code spreading techniques and transmits the message information to the proper destination node.

In alternate embodiments, the terrestrial station transmits the message information and coding information through a satellite network using the transmission capabilities inherent in the satellite network to a terminating satellite. At this terminating satellite, the coding information is used to spread the message information so that the message information can be sent to the destination node.

When a node, such as a terrestrial station, wants to transmit information, it transmits a request to a communication satellite. This also could be the result of a command from a system control center or an on-board process. The communication satellite and the terrestrial station cooperate to establish the spread spectrum channel communication channel between themselves.

When the communication satellite receives a request to establish a spread spectrum communication channel from a terrestrial station, then the communication satellite or a control center determines if communication channel can be established. Communication channels will not be established when resources are not available or overloaded. Communication channels are also not established if the user does not have access privileges. The satellite communicates with the terrestrial station to establish communication parameters and access privileges. The satellite and the terrestrial station must have knowledge about the data formatting rules used to establish the communication channel. Message queues and buffers are established to ensure that information messages are not lost if the links are heavily loaded.

A communication satellite which has been adapted to use routing codes to spread and despread signals in a spread spectrum communication system could be used to provide additional resources in the satellite communication system. No unique links are provided between the satellites. To support global connectivity, the modified satellites could replace existing satellites in the constellation.

The method and apparatus of the present invention enable the capabilities of a spread spectrum communication system to be greatly enhanced through the use of routing by codes. Using spreading codes to carry routing information can be optimized for various missions, and additional cost benefits can be accrued by the system using the method and apparatus of the present invention.

The present invention has been described above with reference to a preferred embodiment. However, those skilled in the art will recognize that changes and modifications can be made in this embodiment without departing from the scope of the present invention. For example, while a preferred embodiment has been described in terms of using a specific number of codes for routing messages, other systems can be envisioned which use different numbers of codes. Accordingly, these and other changes and modifications which are obvious to those skilled in the art are intended to be included within the scope of the present invention.

What is claimed is:

1. In a communication system comprising a plurality of origination nodes and a plurality of destination nodes, a method for routing message information between said plurality of origination nodes and said plurality of destination nodes, said method comprising the steps of:

identifying a destination node with a first destination code, said first destination code spreading said message information in an origination node and despreading said message information in said destination node;

establishing a first route from said origination node to said destination node, wherein said first route comprises a plurality of intermediary nodes;

determining a first set of routing codes for said first route, wherein an intermediary node is identified by a routing code, said routing code spreading said message information in said origination node and despreading said message information in said intermediary node;

spreading a first block of said message information into a spread spectrum signal using said first destination code and said first set of routing codes; and sending said spread spectrum signal from said origination node.

2. The method as claimed in claim 1, further comprising the steps of:

receiving said spread spectrum signal by a first intermediary node, said first intermediary node being between said origination node and said destination node;

despreading said spread spectrum signal into a first despread signal by using said routing code for said first intermediary node; and sending said first despread signal from said first intermediary node.

3. The method as claimed in claim 2, further comprising the steps of:

receiving said first despread signal by a second intermediary node, said second intermediary node being between said first intermediary node and said destination node;

despreading said first despread signal into a second despread signal by using said routing code for said second intermediary node; and sending said second despread signal from said second intermediary node.

4. The method as claimed in claim 3, further comprising the steps of:

receiving said second despread signal by said destination node, said destination node being a termination point for said first route; and despreading said second despread signal into said first block of said message information by using said first destination code.

5. The method as claimed in claim 2, further comprising the steps of:

receiving said first despread signal by said destination node, said destination node being a termination point for said first route; and despreading said first despread signal into said first block of said message information by using said first destination code.

6. The method as claimed in claim 1, further comprising the steps of:

identifying said origination node with a second destination code;

establishing a second route from said destination node to said origination node, wherein said second route comprises a second plurality of intermediary nodes;

determining a second set of routing codes for said second route, wherein each of said second plurality of intermediary nodes is identified by a routing code, said routing code spreading said message information in an origination node and despreading said message information in said each of said second plurality of intermediary nodes;

spreading a second block of said message information into a second spread spectrum signal using said second destination code and said second set of routing codes; and sending said second spread spectrum signal from said destination node.

7. The method as claimed in claim 6, further comprising the steps of:

receiving said second spread spectrum signal by a first intermediary node, said first intermediary node being between said destination node and said origination node and being one of said second plurality of intermediary nodes;

despreading said second spread spectrum signal into a first despread signal by using said routing code for said first intermediary node; and sending said first despread signal from said first intermediary node.

8. The method as claimed in claim 7, further comprising the steps of:

receiving said first despread signal by a second intermediary node, said second intermediary node being between said destination node and said origination node and being one of said second plurality of intermediary nodes;

despreading said first despread signal into a second despread signal by using said routing code for said second intermediary node; and sending said second despread signal from said second intermediary node.

9. The method as claimed in claim 8, further comprising the steps of:

receiving said second despread signal by said origination node, said origination node being a termination point for said second route; and despreading said second despread signal into said second block of said message information by using said second destination code.

10. The method as claimed in claim 7, further comprising the steps of:

receiving said first despread signal by said origination node, said origination node being a termination point for said second route; and despreading said first despread signal into said second block of said message information by using said second destination code.

11. In a communication system comprising a plurality of origination nodes and a plurality of destination nodes, a method for operating a terrestrial station which has been adapted to determine routing codes for routing message information between said plurality of origination nodes and said plurality of destination nodes, said method comprising the steps of:

receiving a request to establish a spread spectrum communication link between an origination node and a destination node;

identifying said destination node with a first destination code, said first destination code spreading said message information in an origination node and despreading said message information in said destination node;

establishing a first route from said origination node to said destination node, wherein said first route comprises a first plurality of intermediary nodes;

determining a first set of routing codes for said first route, wherein an intermediary node is identified by a routing code and said first set of routing codes comprises a first plurality of said routing codes, said routing code spreading said message information in said origination node and despreading said message information in one of said first plurality of intermediary nodes; and sending said first destination code and said first set of routing codes to said origination node, said origination node generating spread spectrum signals using said first destination code and said first set of routing codes.

12. The method as claimed in claim 11, further comprising the steps of:

identifying said origination node with a second destination code, said second destination code spreading said message information in said destination node and despreading said message information in said origination node;

establishing a second route from said destination node to said origination node, wherein said second route comprises a second plurality of intermediary nodes;

determining a second set of routing codes for said second route, wherein each of said second plurality of intermediary nodes is identified by a routing code and said second set of routing codes comprises a second plurality of said routing codes; and sending said second destination code and said second set of routing codes to said destination node.

13. A method for operating a communication device as an intermediary node which has been adapted to use routing codes to despread and route signals in a spread spectrum communication system, said method comprising the steps of:

receiving at said communication device at least one spread spectrum signal that has been spread using a set of routing codes and at least one destination code, wherein said communication device comprises at least one first-level decoder;

despreading said at least one spread spectrum signal, using said at least one first-level decoder, into at least one first-level decoded signal, said at least one first-level decoder using a first-level routing code;

providing said at least one first-level decoded signal to a plurality of second-level decoder, wherein said communication device comprises said plurality of second-level decoders; and despreading said at least one first-level decoded signal into a plurality of second-level decoded signals using said plurality of second-level decoders, said plurality of second-level decoders using a plurality of second-level routing codes.

14. The method as claimed in claim 13, wherein said communication device comprises a destination node, said destination node using a destination code as a despreading code.

15. The method as claimed in claim 13, further comprising the steps of:

sending said at least one first-level decoded signal to at least one other communication device;

providing said at least one first-level decoded signal to a plurality of second-level decoders, wherein said at least one other communication device comprises said plurality of second-level decoders; and despreading said at least one first-level decoded signal into a plurality of second-level decoded signals using said plurality of second-level decoders, said plurality of second-level decoders using a plurality of second-level routing codes.

16. The method as claimed in claim 13, further comprising the step of:

sending said plurality of second-level decoded signals to at least one destination node, said at least one destination node using a destination code as a despreading code to despread at least one of said plurality of second-level decoded signals.

17. The method as claimed in claim 13, further comprising the steps of:

providing said plurality of second-level decoded signals to a plurality of third-level decoders, wherein said communication device comprises said plurality of third-level decoders;

despreading said plurality of second-level decoded signals into at least one third-level decoded signal using one of said plurality of third-level decoders, said plurality of third-level decoders using a plurality of third-level routing codes; and sending said at least one third-level decoded signal to at least one destination node, said at least one destination node using a destination code as a despreading code.

18. The method as claimed in claim 13, further comprising the step of:

operating a terrestrial station as said communication device.

19. The method as claimed in claim 13, further comprising the step of:

operating a communication satellite as said communication device.

20. The method as claimed in claim 13, further comprising the step of:

operating a communication unit as said communication device.

21. A method for operating a communication device which has been adapted to use routing codes to spread signals in a spread spectrum communication system, said method comprising the steps of:

determining a destination code for a destination node;

determining a route from an origination node to said destination node;

receiving by said origination node at least one message signal, said at least one message signal for transmission to said destination node;

spreading said at least one message signal using a first-level encoder into at least one first-level encoded signal, said first-level encoder using said destination code as a spreading code;

determining a first-level path code from said origination node to said destination node, said first-level path code being a first part of said route; and spreading said at least one first-level encoded signal into at least one second-level encoded signal using a second-level encoder, said second-level encoder using said first-level path code.

22. The method as claimed in claim 21, further comprising the steps of:

determining a second-level path code from said origination node to said destination node, said second-level path code being a second part of said route; and spreading said at least one second-level encoded signal into at least one third-level encoded signal using a third-level encoder, said third-level encoder using said second-level path code.

23. The method as claimed in claim 22, further comprising the steps of:

determining a third-level path code from said origination node to said destination node, said third-level path code being a third part of said route;

spreading said at least one third-level encoded signal into at least one fourth-level encoded signal using a fourth-level encoder, said fourth-level encoder using said third-level path code; and transmitting said at least one fourth-level encoded signal.

24. The method as claimed in claim 22, further comprising the step of:

transmitting said at least one third-level encoded signal.

25. The method as claimed in claim 21, further comprising the step of:

transmitting said at least one second-level encoded signal.

26. The method as claimed in claim 21, further comprising the step of:

operating a terrestrial station as said communication device.

27. The method as claimed in claim 21, further comprising the step of:

operating a communication satellite as said communication device.

28. The method as claimed in claim 21, further comprising the step of:

operating a communication unit as said communication device.

29. A spread spectrum satellite communication system comprising:

a plurality of communication satellites which have been adapted to use destination codes and routing codes to spread and despread signals in said spread spectrum satellite communication system, said routing codes establishing a plurality of signal paths within said plurality of communication satellites;

at least one terrestrial station which has been adapted to use said destination codes and said routing codes to spread and despread signals in said spread spectrum satellite communication system, said routing codes establishing a plurality of signal paths within said at least one terrestrial station;

a plurality of communication units which have been adapted to use said destination codes and said routing codes to spread and despread signals in said spread spectrum satellite communication system, said routing codes establishing a plurality of signal paths within said plurality of communication units; and at least one control center for controlling said spread spectrum satellite communication system, said at least one control center providing said destination codes and said routing codes.

30. The spread spectrum satellite communication system as claimed in claim 29, further comprising:

at least one communication satellite which has not been adapted to use routing codes to spread and despread signals in said spread spectrum satellite communication system.

31. A communication device for use in a spread spectrum satellite communication system, wherein said communication device comprises:

at least one antenna subsystem for receiving at least one spread spectrum signal that has been spread using a set of routing codes and at least one destination code;

a plurality of transceivers coupled to said at least one antenna subsystem, said plurality of transceivers for processing said at least one spread spectrum signal;

a plurality of decoders coupled to said plurality of transceivers for decoding said at least one spread spectrum signal using said set of routing codes;

at least one processor coupled to said plurality of transceivers and to said plurality of decoders, said at least one processor for controlling said plurality of transceivers and said plurality of decoders; and at least one memory coupled to said at least one processor, said at least one memory for storing data, wherein said data comprises instructions.

32. The communication device as claimed in claim 31, wherein said communication device further comprises:

at least one encoder coupled to said plurality of transceivers and to said at least one processor for encoding spread spectrum signals transmitted by said communication device.

33. The communication device as claimed in claim 31, wherein said communication device is a terrestrial station.

34. The communication device as claimed in claim 31, wherein said communication device is a communication satellite.

35. The communication device as claimed in claim 31, wherein said communication device is a communication unit.

* * * * *